United States Patent [19]

Heberling et al.

[11] Patent Number: 5,444,982
[45] Date of Patent: Aug. 29, 1995

[54] CYCLONIC PRECHAMBER WITH A CENTERBODY

[75] Inventors: Paul V. Heberling; Mark P. Kelsey, both of Cincinnati; Willard J. Dodds, West Chester, all of Ohio

[73] Assignee: General Electric Company, Cincinnati, Ohio

[21] Appl. No.: 180,245

[22] Filed: Jan. 12, 1994

[51] Int. Cl.⁶ .............................................. F23R 3/32
[52] U.S. Cl. ........................................ 60/737; 60/748
[58] Field of Search .................... 60/737, 748, 740; 239/404, 405, 406, 472

[56] References Cited

U.S. PATENT DOCUMENTS

| | | |
|---|---|---|
| 3,703,259 | 11/1972 | Sturgess et al. |
| 3,713,588 | 1/1973 | Sharpe .................. 239/406 |
| 3,788,067 | 1/1974 | Carlisle et al. ............ 60/748 |
| 3,808,803 | 5/1974 | Salvi |
| 3,811,278 | 5/1974 | Taylor |
| 3,853,273 | 12/1974 | Bahr et al. |
| 3,904,119 | 9/1975 | Watkins ............... 239/405 |
| 3,927,835 | 12/1975 | Gerrard |
| 3,982,392 | 9/1976 | Crow ...................... 60/737 |
| 4,198,815 | 4/1980 | Bobo et al. ............ 239/406 |
| 4,222,243 | 9/1980 | Mobsby |
| 4,241,586 | 12/1980 | Caruel et al. |
| 4,246,757 | 1/1981 | Heberling |
| 4,271,675 | 6/1981 | Jones et al. ............. 60/737 |
| 4,380,905 | 4/1983 | Smart et al. |
| 4,408,461 | 10/1983 | Bruhwiler et al. |
| 4,653,278 | 3/1987 | Vinson et al. |
| 4,854,127 | 8/1989 | Vinson et al. ........... 60/748 |
| 4,932,861 | 6/1990 | Keller et al. |
| 4,974,416 | 12/1990 | Taylor |
| 5,009,589 | 4/1991 | Shekleton et al. |
| 5,020,329 | 6/1991 | Ekstedt et al. ........... 60/737 |
| 5,121,608 | 6/1992 | Willis et al. ............. 60/737 |
| 5,129,231 | 7/1992 | Becker et al. |
| 5,165,241 | 11/1992 | Joshi et al. |

FOREIGN PATENT DOCUMENTS 2356822  5/1975  Germany

OTHER PUBLICATIONS

"A Review Of Confined Vortex Flows", National Aeronautics and Space Administration Contractor Report No. 1772, Jul., 1971, by W. S. Lewellen, pp. 13–25.

"An Analysis Of The Vortex Flow In The Cyclone Separator", Transactions of the ASME, Journal of Basic Engineering, pp. 609–618, Dec., 1962.

"Experimental Evaluation of a Low Emissions, Variable Geometry, Small Gas Turbine Combustor", by K. O. Smith, M. H. Samii, and H. K. Mak, presented at the Gas Turbibe and Aeroengine Congress and Exposition—Jun. 11–14, 1990, pp. 1–6.

(List continued on next page.)

Primary Examiner—Timothy S. Thorpe
Attorney, Agent, or Firm—Andrew C. Hess; David L. Narciso

[57] ABSTRACT

The present invention provides a cyclonic precombustion mixing chamber or prechamber having an axially extending annular cyclonic chamber to vaporize liquid fuel therein and a centerbody centrally disposed within. A fuel injection means introduces liquid fuel radially outward into the cyclonic chamber. The centerbody extends axially through an annular exit of the prechamber to define a throat and throat exit therebetween which is optimally designed for preventing backflash and autoignition. In one embodiment the diameter of the throat is sized to substantially match the diameter of the potential core. The diameter of the potential core and the centerbody at the throat exit, $D_c$, may given by the solution to the following equation;

$$4(D_c/D_t)^4 = (\rho/\Delta P)V_w^2(D_w/D_t)^2[1+(D_c/D_t)^2]$$

where $D_t$ is the diameter of the outer edge of the throat exit, $\rho$ is the density of the air (determined from the air pressure and temperature at the inlet of the prechamber), $D_w$ is the inside diameter of the cyclone as defined by a cyclonic chamber inlet, $V_w$ is the tangential velocity, and $\Delta P$ is the total pressure drop across the combustor (about 5% of the total pressure of the compressor discharge flow in many aircraft gas turbine engine combustors).

13 Claims, 3 Drawing Sheets

OTHER PUBLICATIONS

"Progress in $NO_x$ and CO Emission Reduction of Gas Turbines", by H. Maghon, P. Berenbrink, H. Termuehlen, and G. Gartner, presented at the Jt. ASME/IEEE Power Generation Conference, Boston, Mass.—Oct. 21–25, 1990, pp. 1–7.

"NASA Advanced Low Emissions Combustor Program", by A. Goyal, E. E. Ekstedt and A. J. Szaniszio, pp. 1–9 (no date).

"Reactive Mixing in Swirling Flows", W. Cheng, Aerodyne Research, Inc., Bedford, Mass., in the AIAA 13th Fluid & Plasma Dynamics Conference—Jul. 14–16, 1980, Snowmass, Colo., pp. 1–9.

CYCLONIC PRECHAMBER WITH A CENTERBODY

BACKGROUND OF THE INVENTION

1. Field of the Invention

The present invention relates to gas turbine engine combustors which have a cyclonic pro-combustion mixing chamber (prechamber) and more particularly to such a cyclonic prechamber having a centerbody optimally designed for preventing backflash and autoignition.

2. Description of Related Art

Gas turbine engine combustors such as those used on aircraft and for ground based industrial and marine applications and which are liquid fueled are prone to undesirable high formation of nitrogen oxides ($NO_x$) particularly from the standpoint of increasingly rigid government standards. As more advanced aircraft are built with evermore stringent requirements, low $NO_x$ combustors become even more important. Combustors have been designed that prevaporize the liquid fuel, i.e. convert to vapor or gaseous form prior to combustion, and the heat for fuel vaporization is provided by hot air supplied to the combustor. However, in many of the proposed combustors the liquid fuel residence time required for a minimally acceptable extent of prevaporiztion has required an inordinately large prechamber, which can result in autoignition therein of the fuel/air mixture during operation.

One solution to this problem is disclosed in U.S. Pat. No. 4,246,757 which issued Jan. 27, 1981, entitled "Combustor Including A Cyclone Prechamber And Combustion Process For Gas Turbines Fired With Liquid Fuel", by the present inventor and assigned to the present assignee. This patent discloses a combustion apparatus and process which provides a good balance between sufficiently long residence time of liquid fuel in a cyclonic prechamber or prevaporization zone for effective fuel vaporization therein and sufficiently short residence time of the ignitable mixture of the resulting fuel vapor with hot air as to substantially avoid autoignition in a cyclonic pre-combustion mixing chamber, which is conventionally referred to as a prechamber, and minimize flashback from a downstream combustion chamber over a variety of operating conditions.

Another U.S. Pat. No. 3,808,803, which issued May 7, 1974, and is entitled "ANTICARBON DEVICE FOR THE SCROLL FUEL CARBURETOR" by Enrico Salvi discloses a scroll-type carburetor having a frustroconical plug, for preventing flashback, mounted on the upstream wall of a spin chamber at a location along the axis of the core outlet and the primary vortex. The spin chamber is scrolled, thereby providing a spiral passage ending in an annular array of swirl vanes located radially inward of the outer annular wall of the spin chamber. The spin chamber however does not have the capability of retaining the liquid fuel until it fully vaporizes.

U.S. Pat. No. 5,165,241, which issued Nov. 24, 1992, and is entitled "Air Fuel Mixer For Gas Turbine Combustor" discloses an air fuel mixer for a gas turbine combustor having a mixing duct, a set of inner and outer counter-rotating swirlers at the upstream end of the mixing duct, and a fuel nozzle located axially along and forming a centerbody of the mixing duct. High pressure air from a compressor is injected into the mixing duct through the swirlers to form an intense shear region and fuel is injected into the mixing duct from the fuel nozzle so that the high pressure air and the fuel is uniformly mixed when the fuel/air mixture is exhausted out the downstream end of the mixing duct into the combustor, ignited, and burned so as to produce minimal formation of pollutants. This mixer is designed to avoid flashback, whereby the flame of the combustor is drawn back into the mixing section, and to avoid auto-ignition of the fuel/air mixture which can occur within the premixing duct if the velocity of the air flow is not fast enough, i.e., where there is a local region of high residence time. One problem with the device is its length which is not as short as is desired particularly for use in aircraft gas turbine engines and more particularly for use in high speed supersonic aircraft gas turbine engines. It is also very desirable to have a mixing of air and vaporized liquid fuel prior to ignition and the apparatus of U.S. Pat. No. 5,165,241 does not appear to accomplish this.

The prechamber assembly of the present invention provides a long residence time for liquid fuel to be vaporized and a short residence time for the resulting mixture of fuel vapor and air which in turn results in minimal formation of nitrogen oxides ($NO_x$). The present invention is further designed to prevent flashback by preventing the recirculating flows from reaching into the prechamber assembly. These are problems that are particularly acute in prechamber assemblies with strong cyclonic action because of the low pressures created by the strong cyclonic action.

SUMMARY OF THE INVENTION

The present invention provides a combustion apparatus for combustion of initially liquid fuel in the combustor of a gas turbine engine to provide motive fluid for the engine. The apparatus provides a cyclonic pre-combustion mixing chamber herein after referred to as a prechamber assembly having an axially extending annular cyclonic chamber to vaporize liquid fuel therein and a centerbody centrally disposed within. A fuel injection means preferably in the form of a nozzle disposed in a hollow central chamber of the centerbody is provided for introducing liquid fuel radially outward thereof into the cyclonic chamber.

The centerbody extends axially through an annular exit of the prechamber assembly to define a throat and throat exit therebetween which is optimally designed for preventing backflash and autoignition. In one embodiment the diameter of the throat is sized to substantially match the diameter of the potential core. The diameter of the potential core and the centerbody at the throat exit, Do, may given by the solution to the following equation;

$$4(D_c/D_t)^4 = (\rho/\Delta P)V_w^2(D_w/D_t)^2[1+(D_c/D_t)^2]$$

where $D_t$ is the diameter of the outer edge of the throat exit, $\rho$ is the density of the air (determined from the air pressure and temperature at the inlet of the assembly), $D_w$ is the inside diameter of the cyclone as defined by a cyclonic chamber inlet, $V_w$ is the tangential velocity just inside the cyclone wall at the cyclonic chamber inlet, and $\Delta P$ is the total pressure drop across the combustor (about 5% of the total pressure of the compressor discharge flow in many aircraft gas turbine engine combustors).

Another embodiment of the present invention provides a prechamber assembly optimized for maximum radial acceleration at the outside edge of the throat exit wherein;

$$(D_c/D_t)=(2/3)^{\frac{1}{2}}=0.816$$

which in terms of a discharge coefficient $C_D$ of the cyclone (based on the total area of the throat and centerbody area at the throat exit) is;

$$C_D=(4M)/\{\pi D_t^2(2\rho\Delta P)^{\frac{1}{2}}\}=0.149$$

wherein M is the mass flow rate of the air through the prechamber assembly which exits through the throat.

ADVANTAGES OF THE PRESENT INVENTION

The present invention reduces formation of nitrogen oxides ($NO_x$) by providing a long residence time for liquid fuel to be vaporized and a short residence time for the resulting mixture of fuel vapor and air. The present invention is further designed to prevent flashback by preventing the recirculating flows from reaching into the prechamber assembly. The recirculating flow reduces the effectiveness of the swirl chamber and its heat can cause autoignition. The combustion apparatus and of this invention provide good balance between sufficiently long residence time of liquid fuel in a prechamber assembly or prevaporization zone for effective fuel vaporization therein and sufficiently short residence time of the ignitable mixture of the resulting fuel vapor with hot air as to substantially avoid autoignition in the prechamber assembly and minimize flashback from a downstream combustion chamber over a variety of operating conditions. The present invention also allows higher swirl, i.e. greater tangential velocity, without recirculation and its unwanted effects.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
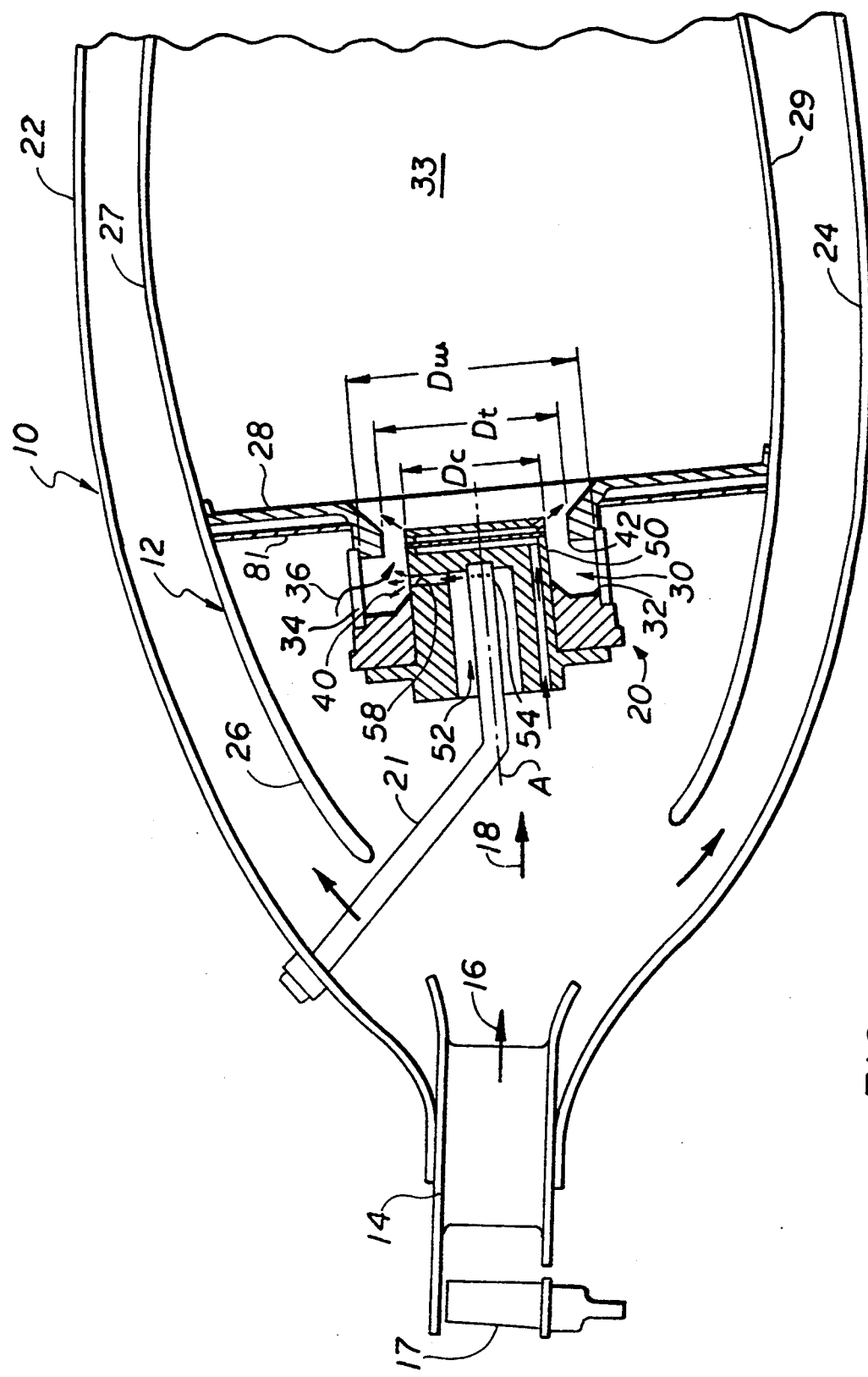
FIG. 1 is a cross-sectional view of a combustor including a cyclonic prechamber assembly in accordance with an exemplary embodiment of the present invention.

Illustrated in FIG. 1 is a gas turbine engine combustion section 10 having a combustor 12 downstream of a diffusor 14 which is operable to receive compressor discharge flow 16 which is generally hot air from a compressor 17 and flow a portion 18 of the compressor discharge flow to a prechamber assembly 20 annularly disposed about an axis for gasifying initially liquid fuel supplied by a fuel tube 21 in accordance with an exemplary embodiment of the present invention.

The combustor 12 is positioned in the compressor discharge flow 16 between an outer combustor casing 22 and an inner combustor casing 24. The combustor 12 is illustrated as being of the annular single dome combustor type having an annular combustor dome 26 and a circumferentially extending combustor dome plate 28. Extending aft from the combustor dome 26 are outer and inner annular combustor liners 27 and 29 respectively which are radially spaced from each other to define a portion of annular combustion flow path or combustion zone 33 therebetween and wherein a mixture of fuel and air from the prechamber assembly 20 is discharged for ignition and combustion.

The invention is illustrated for use in single dome annular combustors characterized by a single annular inner and outer liners radially extending from a combustor dome having a single annular dome and dome plate wherein the dome plate has a ring of prechamber assemblies for introducing the fuel and air mixture into the combustion zone. The invention is also applicable to double and multiple dome combustors having two or more combustor dome plates and to can annular combustors typically having a plurality of combustor cans disposed circumferentially about a combustor centerline within a combustor section of a gas turbine engine.

As used in this description and in the claims which follow, unless otherwise indicated the terms "downstream" refers to the direction of the arrows indicating the compressor discharge flow 16 and the flow a portion 18 whereas the term "upstream" refers to the opposite direction in FIG. 1.

Figure 2:
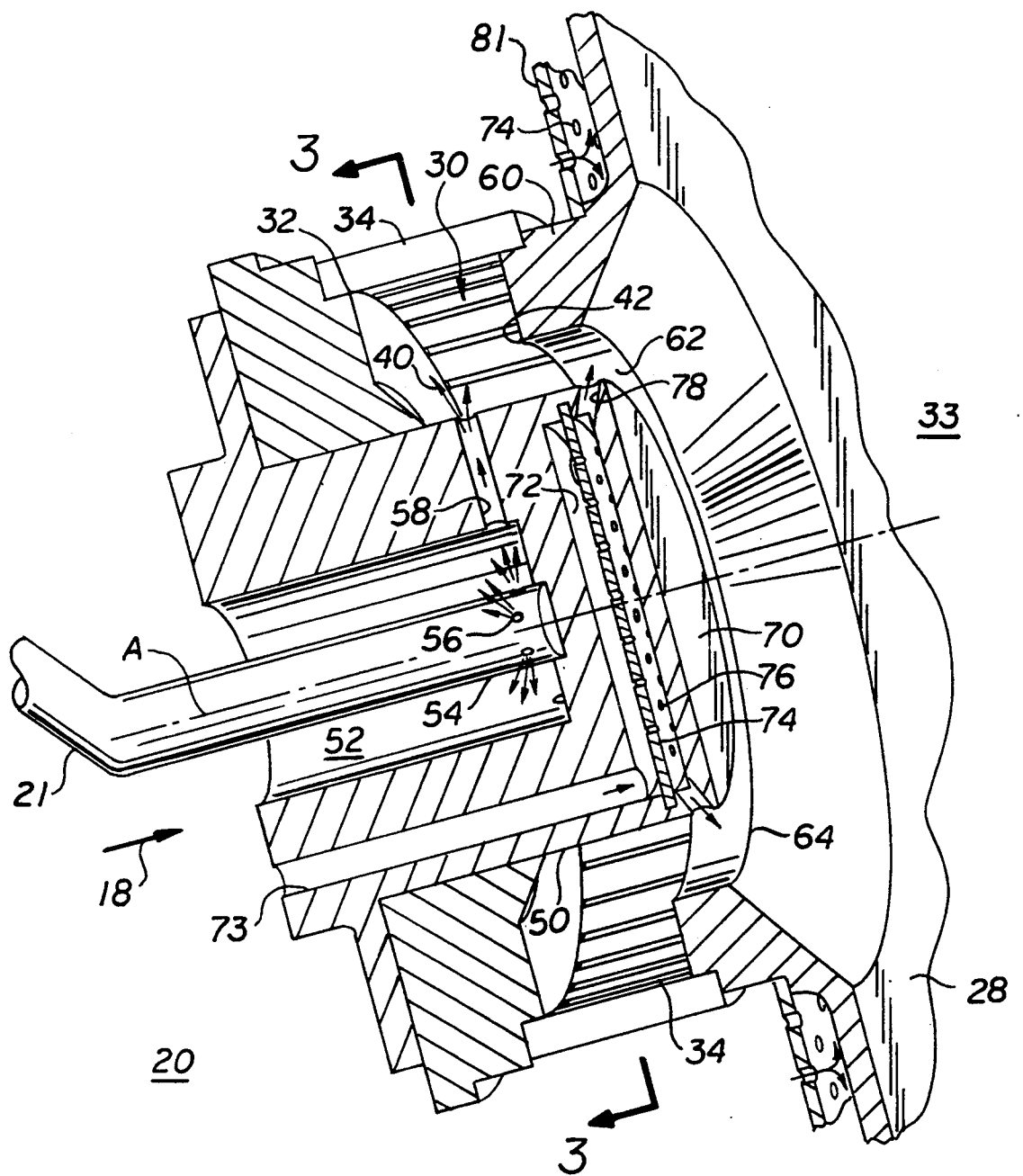
FIG. 2 is a perspective view, partly in section, of the cyclonic prechamber assembly in FIG. 1.

Referring to FIGS. 1 and 2, for more particularity, the prechamber assembly 20 includes an annular cyclonic chamber 30 which is circumscribed at its radially outer diameter $D_w$ by an annular swirl chamber inlet 32 having a swirling means 34 disposed therein. The swirling means 34 is operable for injecting hot spinning air 36 into the cyclonic chamber 30 at a high enough speed and at a highly tangential angle to the annular cyclonic chamber 30 so that radially injected liquid fuel 40 injected into the cyclonic chamber will remain in the chamber until it vaporizes and mixes with the spinning air 36. The prechamber assembly 20 has an annular cyclonic chamber outlet 42 disposed radially inward of the annular cyclonic chamber inlet 32 and the cyclonic chamber 30 is disposed between the annular cyclonic chamber inlet and outlet 32 and 42 respectively.

A cylindrical centerbody 50 having a centerbody diameter $D_c$ and a hollow interior 52 is disposed radially inward of and concentrically apart from the cyclonic chamber 30. The hollow interior 52 is open at its upstream end to the portion 18 of the compressor discharge flow and the fuel tube 21 is disposed within the interior and culminates in a radially directed fuel injector 54 at a downstream end of the hollow interior 52. Radially oriented, and preferably cylindrical, fuel apertures 56 of the fuel injector 54 are collinear with centerbody radial passages 58 radially disposed through the centerbody 50 and aimed at the cyclonic chamber 30. The cylindrical centerbody 50 extends through an annular wall 60 downstream of the cyclonic chamber 30 to form a prechamber assembly outlet 62 having a throat 64 therebetween with an outer throat edge diameter $D_t$.

The preferred embodiment of the present invention provides that the centerbody diameter $D_c$ is sized according to the following equation;

$$4(D_c/D_t)^4=(\rho/\Delta P)V_w^2(D_w/D_t)^2[1+(D_c/D_t)^2]$$

wherein;

$\rho p$ is a predetermined density of air at said cyclonic chamber inlet, $V_w$ is a predetermined tangential velocity just at the cyclonic chamber inlet 32, and $\Delta P$ is a predetermined total pressure drop across the combustor which for many applications is about 5% of the total pressure of the compressor discharge flow 16. One more particular embodiment provides that the prechamber assembly 20 is constructed with a ratio of $D_c$ to $D_t$ of about 0.816.

Referring now more particularly to FIG. 2, the centerbody 50 further includes an axially downstream end wall 70 that is provided with an end wall cooling means disposed beneath the end wall in the form of a cooling air chamber 72 which is supplied with cooling air by axially extending cooling air passages 73 and is bifurcated by a circular impingement baffle plate 74 spaced axially upstream, with respect to the portion 18 of the compressor discharge flow 16, of the end wall. Impingement cooling air apertures 76 are disposed through the circular impingement baffle plate 74 for impinging cooling air flow on the end wall and exhaust holes 78 provides a means for exhausting spent cooling air from the cooling air chamber 72 after cooling air has impinged the end wall. Though the portion 18 of the compressor discharge flow 16 is hot enough to help gasify the liquid fuel it is cool enough to provide significant cooling for the end wall 70 to provide thermal protection from the high temperature heat generated in the combustion zone 33. Impingement cooling air apertures 76 are also disposed through an annular impingement baffle plate 81 spaced apart from and operable to impinging cooling air flow on the combustor dome plate 28.

Figure 3:
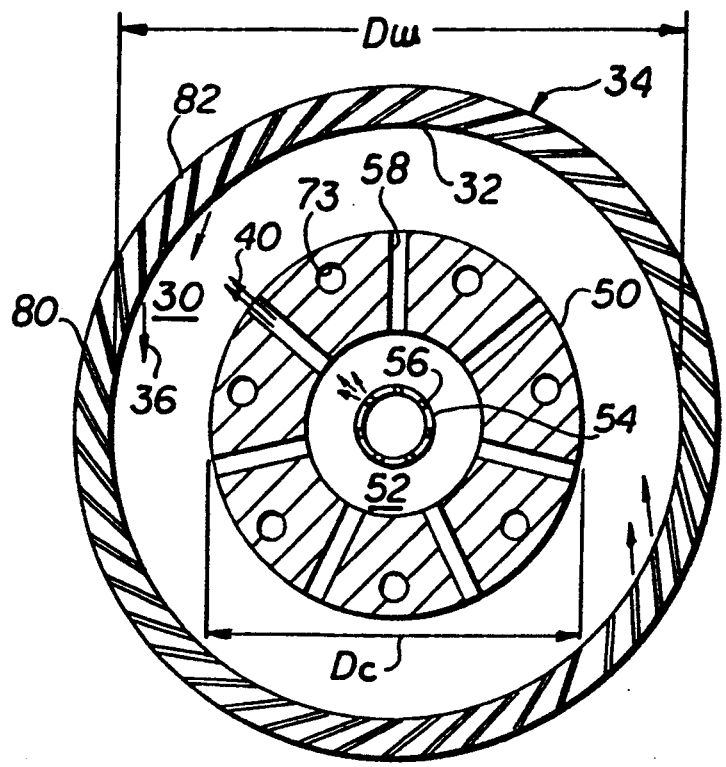
FIG. 3 is a cross-sectional view taken through 3—3 in FIG. 2 illustrating a swirling means and cooling air passages through the centerbody of the cyclonic prechamber assembly.

Illustrated in FIG. 3 is one embodiment of the swirling means 34 in FIGS. 2 and 3, which injects the hot spinning air 36 into the cyclonic chamber 30 at a high enough speed and at a tangential angle to the annular cyclonic chamber 30 so that the radially injected liquid fuel 40 which is injected through the centerbody radial passages 58 into the cyclonic chamber will be entrained in the spinning flow and remain in the chamber until it vaporizes. The liquid fuel may be atomized by the fuel injector 54 but the centrifugal forces created by the swirling means 34 and the hot spinning air 36 should be designed sufficient to prevent all but the smallest of fuel drops from exiting the cyclonic chamber 30 before being vaporized. A plurality of tangentially angled slots 80 are disposed in an outer annular wall 82 of the cyclonic chamber 30 to form the cyclonic chamber inlet 32.

Figure 4:
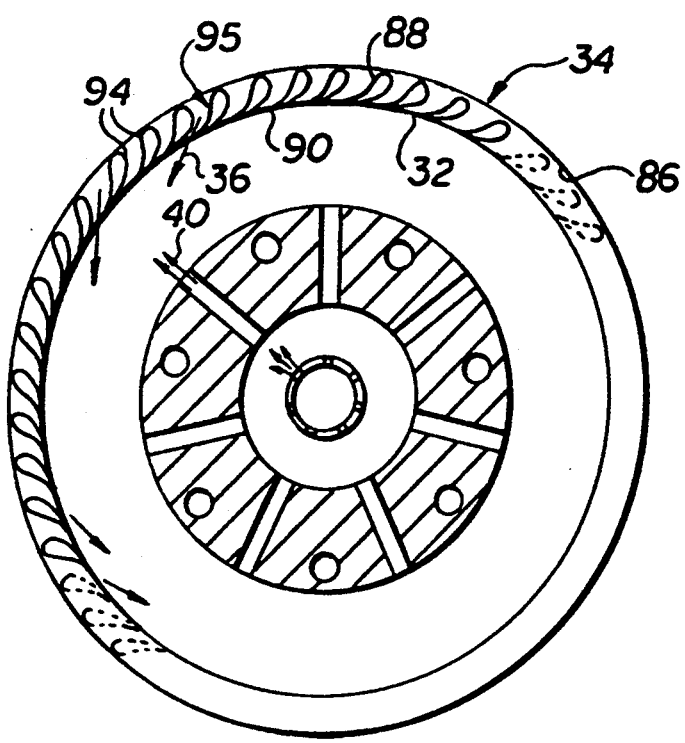
FIG. 4 is a cross-sectional view taken similar to that in FIG. 2 illustrating an alternative means for swirling the air of the cyclonic prechamber assembly.

An alternative construction for the swirling means 34 is illustrated in FIG. 4, wherein the cyclonic chamber inlet 32 is an annular space 86 with a plurality of tangentially angled and spaced apart swirl vanes 88 disposed therein. The generally cylindrical cyclonic chamber inlet 32 is bordered by a radially inner envelope formed by trailing edges 90 of the swirl vanes 88. Opposing faces 94 of each pair of adjacent swirl vanes 88 define inwardly converging airflow channels 95 for introducing hot spinning air 36 into the cyclonic chamber 30. This air is preferably supplied at a sufficiently high temperature to rapidly vaporize the injected liquid fuel 40. The swirl vanes 88 are so structured and oriented relative one to another that the combustion air can be introduced into the prechamber assembly 20 with a high tangential velocity. It has been found that a ratio of tangential velocity to radial velocity of greater than 3:1 is advantageous.

The foregoing description of a preferred embodiment of the invention has been presented for purposes of illustration. It is not intended to be exhaustive or to limit the invention to the precise form disclosed, and obviously many modifications and variations are possible in light of the above teachings without departing from the scope of the invention as set forth in the appended claims.

We claim:

1. A combustion apparatus for use in a gas turbine engine combustor, said apparatus comprising:

an axially extending cyclonic prechamber assembly to vaporize liquid fuel injected therein having an annular cyclonic chamber and terminating in an annular throat axially downstream of said annular cyclonic chamber, said annular cyclonic chamber extending through at least an axially extending portion of said prechamber assembly, said cyclonic chamber having a radially outer cyclonic chamber inlet and a radially inner cyclonic chamber outlet, a swirling means disposed in said cyclonic chamber inlet for inducing cyclonic motion in said cyclonic chamber, a centerbody centrally axially disposed within said prechamber assembly and extending through and in part forming a prechamber assembly outlet downstream of said cyclonic chamber outlet wherein said throat is disposed in said prechamber assembly outlet, and said centerbody at said throat exit has a centerbody diameter $D_c$, which is given by a solution to the following equation, $$4(D_c/D_t)^4 = (\rho/\Delta P)V_w^2(D_w/D_t)^2[1+(D_c/D_t)^2]$$

wherein;

$D_t$ is a predetermined diameter of an outer edge of said throat, $\rho$ is a predetermined density of air at said cyclonic chamber inlet, $D_w$ is a predetermined radially outer diameter of said cyclonic chamber, $V_w$ is a predetermined tangential velocity through said swirling means, and $\Delta P$ is a predetermined pressure drop across the combustor.

2. A combustion apparatus as claimed in claim 1 wherein said cyclonic chamber is cylindrical in shape.

3. A combustion apparatus as claimed in claim 2 wherein said centerbody is cylindrical in shape.

4. A combustion apparatus as claimed in claim 1 further comprising a liquid fuel injection means operably disposed within said centerbody to inject liquid fuel radially into said cyclonic chamber.

5. A combustion apparatus as claimed in claim 3 wherein said prechamber assembly is constructed with a ratio of $D_c$ to $D_t$ of about 0.816.

6. A combustion apparatus as claimed in claim 3 further comprising a liquid fuel injection means operably disposed within said centerbody to inject liquid fuel radially into said cyclonic chamber.

7. A combustion apparatus as claimed in claim 4 wherein said centerbody further comprising an axially downstream end wall disposed in said throat and an end wall cooling means disposed beneath said end wall for cooling said end wall.

8. A combustion apparatus as claimed in claim 6 wherein said end wall cooling means includes;
- a cooling air chamber axially bifurcated by an impingement baffle plate spaced axially upstream of said end wall,
- axially extending cooling air passages through said centerbody in fluid supply communication with said cooling air chamber downstream of said baffle plate,
- impingement cooling air apertures disposed through said baffle plate operable for impinging cooling air flow on said end wall, and
- a means for exhausting spent cooling air from said cooling air chamber after cooling air has impinged said end wall.

9. A combustion apparatus as claimed in claim 8 wherein said cyclonic chamber and said centerbody are cylindrical in shape and said prechamber assembly is constructed with a ratio of $D_c$ to $D_t$ of about 0.816.

10. A combustion apparatus as claimed in claim 7 wherein said swirling means comprises a plurality of tangentially angled slots disposed in an outer annular wall of said cyclonic chamber that forms said cyclonic chamber inlet.

11. A combustion apparatus as claimed in claim 7 wherein said cyclonic chamber inlet is an annular space and said swirling means comprises a plurality of tangentially angled swirl vanes disposed in said cyclonic chamber inlet.

12. A combustion apparatus for use in a gas turbine engine combustor, said apparatus comprising:
- an axially extending cyclonic prechamber assembly to vaporize liquid fuel injected therein having an annular cyclonic chamber and terminating in an annular throat axially downstream of said annular cyclonic chamber,
- said annular cyclonic chamber extending through at least an axially extending portion of said prechamber assembly,
- said cyclonic chamber having a radially outer cyclonic chamber inlet and a radially inner cyclonic chamber outlet,
- a swirling means disposed in said cyclonic chamber inlet for inducing cyclonic motion in said cyclonic chamber,
- a centerbody centrally axially disposed within said prechamber assembly and extending through and in part forming a prechamber assembly outlet downstream of said cyclonic chamber outlet wherein said throat is disposed in said prechamber assembly outlet, and
- said centerbody at said throat exit has a centerbody diameter $D_c$ and said throat at said throat exit has a throat outer edge diameter $D_t$ such that the ratio of $D_c/D_t$ is given by a solution to the following equation, $$4(D_c/D_t)^4 = (\rho/\Delta P)V_w^2(D_w/D_t)^2[1+(D_c/D_t)^2]$$

wherein;
- $\rho$ is a predetermined density of air at said cyclonic chamber inlet,
- $D_w$ is a predetermined radially outer diameter of said cyclonic chamber,
- $V_w$ is a predetermined tangential velocity through said swirling means, and
- $\Delta P$ is a predetermined pressure drop across the combustor.

13. A combustion apparatus for use in a gas turbine engine combustor, said apparatus comprising:
- an axially extending cyclonic prechamber assembly to vaporize liquid fuel injected therein having an annular cyclonic chamber and terminating in an annular throat axially downstream of said annular cyclonic chamber,
- said annular cyclonic chamber extending through at least an axially extending portion of said prechamber assembly,
- said cyclonic chamber having a radially outer cyclonic chamber inlet and a radially inner cyclonic chamber outlet,
- a swirling means disposed in said cyclonic chamber inlet for inducing cyclonic motion in said cyclonic chamber,
- a centerbody centrally axially disposed within said prechamber assembly and extending through to at least said throat and in part forming a prechamber assembly outlet downstream of said cyclonic chamber outlet wherein said throat is disposed in said prechamber assembly outlet, and
- said centerbody at said throat exit has a centerbody diameter ($D_c$), which is sized to substantially match the diameter of a potential core for a predetermined operating condition in the combustor.

* * * * *